United States Patent Office 3,244,745
Patented Apr. 5, 1966

3,244,745
PROCESS FOR THE PREPARATION OF CHLORO-
METHYLPHOSPHONOUS CHLORIDE
Arthur Dock Fon Toy, Park Forest, Ill., and Kenneth H.
Rattenbury, Kansas City, Mo., assignors to Stauffer
Chemical Company, New York, N.Y., a corporation of
Delaware
No Drawing. Continuation of application Ser. No.
277,142, May 1, 1963. This application Nov. 19,
1964, Ser. No. 412,333
5 Claims. (Cl. 260—543)

This application is a continuation of U.S. Serial No. 277,142, filed May 1, 1963, which was a continuation-in-part of copending application, Serial No. 58,898, filed September 28, 1960 both now abandoned.

This invention relates to an improved process for preparing chloromethylphosphonous chloride ($ClCH_2PCl_2$).

Chloromethylphosphonous chloride is a known compound suitable for use as a chemical intermediate in the preparation of a number of organic phosphinate and phosphonate ester compounds.

Heretofore, chloromethylphosphonous chloride was produced by the method of A. Yakubovich and V. Ginsberg [Zhur. Obshchei. Khim. 22, p. 1534 (1952)] by reacting phosphorous trichloride with diazomethane at a temperature of about $-70°$ C. The method gave yields of about 40% and was quite hazardous to carry out.

By the process of the present invention, chloromethylphosphonous chloride can be easily prepared in high yields and high purity without encountering hazardous operating conditions. The new procedure involves a sulfur exchange reaction, carried out by reacting chloromethylphosphonothioic chloride with phenylphosphonous chloride in accordance with the following equation:

In a typical example, 1437 grams (7.85 moles) of chloromethylphosphonothioic chloride, and 1612 grams (9.05 moles or 15% excess) of phenylphosphonous chloride were placed in a three liter, three-necked reaction flask equipped with a condenser fitted with a $CaCl_2$ tube to exclude moisture and maintain an anhydrous, non-oxidizing inert atmosphere, a stirrer and thermometer. The mixture was heated at reflux temperatures of 165° to 175° C. in an atmosphere of nitrogen for about three hours, then cooled and fractionally distilled. The fraction boiling at 67° to 120° at 100 mm. Hg pressure was collected and carefully refractionated at atmospheric pressure. The fraction boiling at 128° to 132° C. was recovered in an amount of 996.4 grams representing an 84% yield of product. The pure product had an index of refraction $N_D{}^{25}=1.5282$, and a density $d_{25}{}^{25}=1.5144$. Analysis showed 20.4% P, 46.5% Cl⁻, and 69.2% total Cl compared to theoretical values of 20.4% P, 46.8% Cl⁻, and 70.2% total Cl for $ClCH_2PCl_2$.

In a similar example, 1010.0 grams (5.5 moles) of

and 1023.7 (5.5 moles+4% excess) grams of $C_6H_5PCl_2$ were heated under reflux in an anhydrous, non-oxidizing inert atmosphere for one hour at about 165° C. On distillation up to 141° C. at 100 mm. Hg, 885.8 grams of distillate was collected. This was refractionated at atmospheric pressure yielding 696.5 grams (83.7% yield) of chloromethylphosphonous chloride ($ClCH_2PCl_2$) boiling at 126° to 133° C. and having an index of refraction $N_D{}^{25}=1.5291$.

The by-product, phenylphosphonothioic chloride

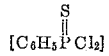

is easily recovered in better than 95% yield having an index of refraction $N_D{}^{25}=1.6141$ by collecting the fraction from the distillation mixture boiling at 75° to 84° C. at 1 mm. Hg. pressure.

Concerning the temperature at which this reaction takes place, the reactants have boiling points at atmospheric pressure as follows:

187° C.; $C_6H_5PCl_2$, 225° C. Likewise, the products have boiling points of 129° C. for $ClCH_2PCl_2$ and 270° C. for

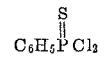

In view of this data, the reflux temperature of a mixture of these compounds would always lie between 129° C. and 270° C. since some reaction apparently takes place almost immediately upon warming the reactants. The temperature during the course of the reaction is generally in the range of 165° to 175° C. Apparently, some of the low boiling $ClCH_2PCl_2$ is formed almost immediately and thus lowers the initial boiling point. Under these circumstances, the preferred temperature for conducting this reaction is within the range of 165° to 175° C. Generally, the reaction is complete in from one to three hours at the preferred temperature.

Since the present invention involves the reaction of phosphorus chlorides, it is necessary in order to achieve maximum yield that the reactions be conducted under substantially anhydrous, non-oxidizing conditions. Preferably, an inert atmosphere is maintained by bubbling an inert gas such as nitrogen or helium through the reactor during the course of the reaction. The inlet and exit lines to the reactor should be guarded against the possible entrance of atmospheric moisture by the use of appropriate drying agents such as calcium chloride.

While the reaction will proceed using various proportions of the reactants, it is preferred to employ the phenylphosphorous chloride reactant in substantially stoichiometric or in small excess amounts to facilitate the fractional separation of the reaction products in their highest state of purity.

While the above description shows a preferred embodiment of the invention, not unnecessary limitations are to be implied therefrom, except as defined in the appended claims.

We claim:
1. A process for the preparation of chloromethylphosphonous chloride which comprises reacting chloromethylphosphonothioic chloride with phenylphosphonous chloride under substantially anhydrous conditions in an inert non-oxidizing atmosphere.

2. A process for the preparation of chloromethylphosphonous chloride which comprises reacting at a temperature between 129° C. and 270° C. and under substantially anhydrous conditions, chloromethylphosphonothioic chloride with phenylphosphonous chloride in an inert non-oxidizing atmosphere and separating the chloromethylphosphonous chloride from the reaction mixture by fractional distillation.

3. A process for the production of chloromethylphosphonous chloride which comprises heating under reflux conditions in a substantially anhydrous non-oxidizing inert atmosphere, at a temperature of from 165° to 175° C., a mixture of chloromethylphosphonothioic chloride and phenylphosphonous chloride for a period of from one to three hours.

4. A process for the production of chloromethylphosphonous chloride which comprises heating under reflux conditions in a substantially anhydrous non-oxidizing inert atmosphere, at a temperature of from 165° to 175° C., a mixture of chloromethylphosphonothioic chloride and phenylphosphonous chloride for a period of from one to three hours and then fractionally distilling the reaction mixture to separate and recover the chloromethylphosphonous chloride produced.

5. A process for the simultaneous production of chloromethylphosphonous chloride and phenylphosphonothioic chloride which comprises heating under reflux conditions in a substantially anhydrous non-oxidizing inert atmosphere at a temperature of 165° to 175° C. a stoichiometric mixture of phenylphosphonous chloride and chloromethylphosphonothioic chloride, for a period of one to three hours, and then fractionally distilling the reaction mixtures and separately recovering the chloromethylphosphonous chloride and the phenylphosphonothioic chloride products.

References Cited by the Examiner

UNITED STATES PATENTS 3,024,278  3/1962  Groenweghe _____ 260—543

FOREIGN PATENTS 713,412  8/1954  Great Britain.

OTHER REFERENCES

Gottlieb: J. Am. Chem. Soc., 54, 1932, pp. 748–750.
Uhing et al.: J. Am. Chem. Soc., vol. 83, 1961, p. 2301.

LORRAINE A. WEINBERGER, *Primary Examiner.*